(12) United States Patent
Scheel et al.

(10) Patent No.: US 7,321,592 B2
(45) Date of Patent: Jan. 22, 2008

(54) METHOD OF AND APPARATUS FOR IMPLEMENTING AND SENDING AN ASYNCHRONOUS CONTROL MECHANISM PACKET USED TO CONTROL BRIDGE DEVICES WITHIN A NETWORK OF IEEE STD 1394 SERIAL BUSES

(75) Inventors: Richard K. Scheel, Pleasanton, CA (US); David V James, Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1106 days.

(21) Appl. No.: 10/189,671

(22) Filed: Jul. 3, 2002

(65) Prior Publication Data

US 2002/0167953 A1 Nov. 14, 2002

Related U.S. Application Data

(63) Continuation of application No. 09/556,080, filed on Apr. 21, 2000, now Pat. No. 6,445,711.

(60) Provisional application No. 60/130,886, filed on Apr. 23, 1999.

(51) Int. Cl.
    *H04L 12/46* (2006.01)
(52) U.S. Cl. ...................... 370/402; 370/410
(58) Field of Classification Search ............... 370/401, 370/402, 389, 392, 285; 710/306, 312, 314, 710/316; 709/238
    See application file for complete search history.

(56) References Cited

U.S. PATENT DOCUMENTS 4,713,702 A 12/1987 Ishihara et al. ............... 360/79

(Continued)

FOREIGN PATENT DOCUMENTS

EP 0 428 111 A2 11/1990

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316-321.

(Continued)

*Primary Examiner*—Min Jung
(74) *Attorney, Agent, or Firm*—Haverstock & Owens LLP

(57) ABSTRACT

An asynchronous control mechanism packet is used to send control messages and information to one or more bridge devices within a network of buses of devices. The asynchronous control mechanism packet is addressed to a device on one of the buses and is intercepted by one or more appropriate bridge devices along the path to the destination device. The asynchronous control mechanism packet is targeted at a particular bridge device or used to send control messages and information to bridge devices along a particular communications route between two devices. The asynchronous control mechanism packet includes a designation specifying that it is an asynchronous control mechanism packet and should be treated accordingly. This designation is recognized by the appropriate bridge devices. Preferably, this designation is included within the extended transaction code field of the packet. In an alternate embodiment, the designation is included within a transaction code field of the packet. In a further alternate embodiment, the designation is included within an address offset value within the packet. Instructional information within the asynchronous control mechanism packet specifies to intercepting bridge devices the type of transaction and control tasks to be performed by the bridge device when the asynchronous control mechanism packet is received.

20 Claims, 6 Drawing Sheets

U.S. PATENT DOCUMENTS

| | | | |
|---|---|---|---|
| 4,930,065 A | 5/1990 | McLagan et al. | 364/200 |
| 4,933,938 A | 6/1990 | Sheehy | 370/85.13 |
| 5,315,705 A | 5/1994 | Iwami et al. | 395/200 |
| 5,408,501 A | 4/1995 | Cornaby | 375/260 |
| 5,434,860 A | 7/1995 | Riddle | 370/84 |
| 5,444,709 A | 8/1995 | Riddle | 370/94.1 |
| 5,448,559 A | 9/1995 | Hayter et al. | 370/60.1 |
| 5,448,698 A | 9/1995 | Wilkes | 395/200.01 |
| 5,499,344 A | 3/1996 | Elnashar et al. | 395/250 |
| 5,517,494 A | 5/1996 | Green | 370/60 |
| 5,519,701 A | 5/1996 | Colmant et al. | 370/60.1 |
| 5,594,734 A | 1/1997 | Worsley et al. | 370/395 |
| 5,602,841 A | 2/1997 | Lebizay et al. | 370/413 |
| 5,615,404 A | 3/1997 | Knoll et al. | 395/882 |
| 5,619,544 A | 4/1997 | Lewis et al. | 375/377 |
| 5,659,373 A | 8/1997 | Hoekstra | 348/734 |
| 5,661,848 A | 8/1997 | Bonke et al. | 395/439 |
| 5,664,124 A | 9/1997 | Katz et al. | 395/309 |
| 5,668,952 A | 9/1997 | Slane | 395/200.75 |
| 5,689,244 A | 11/1997 | Iijima et al. | 340/825.07 |
| 5,719,942 A | 2/1998 | Aldred et al. | 380/49 |
| 5,729,755 A | 3/1998 | Turski | 395/800 |
| 5,748,911 A | 5/1998 | Maguire et al. | 395/281 |
| 5,758,075 A | 5/1998 | Graziano et al. | 395/200.8 |
| 5,815,668 A | 9/1998 | Hashimoto | 395/200.68 |
| 5,835,725 A | 11/1998 | Chiang et al. | 395/200.58 |
| 5,867,656 A | 2/1999 | Iwasaki et al. | 395/200.45 |
| 5,884,027 A | 3/1999 | Garbus et al. | 395/200.8 |
| 5,926,626 A * | 7/1999 | Takeuchi et al. | 709/249 |
| 5,940,592 A | 8/1999 | Ioki et al. | 395/200.3 |
| 5,941,964 A | 8/1999 | Young et al. | 710/100 |
| 5,987,555 A | 11/1999 | Alzien et al. | 710/129 |
| 5,991,520 A | 11/1999 | Smyers et al. | 395/280 |
| 6,006,286 A | 12/1999 | Baker et al. | 710/22 |
| 6,032,261 A | 2/2000 | Hulyalkar | 713/400 |
| 6,034,964 A | 3/2000 | Fukushima et al. | 370/401 |
| 6,115,392 A | 9/2000 | Nomura | 370/466 |
| 6,157,650 A | 12/2000 | Okuyama et al. | 370/401 |
| 6,167,492 A * | 12/2000 | Keller et al. | 711/154 |
| 6,170,025 B1 * | 1/2001 | Drottar et al. | 710/48 |
| 6,189,063 B1 | 2/2001 | Rekeita et al. | 710/130 |
| 6,292,489 B1 * | 9/2001 | Fukushima et al. | 370/401 |
| 6,308,147 B1 * | 10/2001 | Keaveny | 703/25 |
| 6,333,929 B1 * | 12/2001 | Drottar et al. | 370/362 |
| 6,389,496 B1 * | 5/2002 | Matsuda | 710/316 |
| 6,445,711 B1 | 9/2002 | Scheel et al. | 370/402 |
| 6,519,268 B1 * | 2/2003 | Smyers | 370/536 |
| 6,519,671 B1 * | 2/2003 | Kondou et al. | 710/311 |
| 6,611,534 B1 * | 8/2003 | Sogabe et al. | 370/471 |
| 6,631,415 B1 * | 10/2003 | James et al. | 709/227 |
| 6,735,201 B1 * | 5/2004 | Mahajan et al. | 370/390 |
| 6,785,274 B2 * | 8/2004 | Mahajan et al. | 370/390 |
| 6,804,236 B1 * | 10/2004 | Mahajan et al. | 370/390 |

OTHER PUBLICATIONS

P1394 Standard For A High Performance Serial Bus, IEEE, 1995.

"The IEEE-1394 High Speed Serial Bus," R.H.J. Bloks, Philips Journal Of Research, vol. 50, No. 1/2, pp. 209-216, 1996.

"Architecture for High Performance Transparent Bridges" Software Patent Institute, 1995, 1996.

P1394a Draft Standard For A High Performance Serial Bus (Supplement), P1394a Draft 2.0 Mar. 15, 1998.

* cited by examiner

METHOD OF AND APPARATUS FOR IMPLEMENTING AND SENDING AN ASYNCHRONOUS CONTROL MECHANISM PACKET USED TO CONTROL BRIDGE DEVICES WITHIN A NETWORK OF IEEE STD 1394 SERIAL BUSES

RELATED APPLICATIONS

This application is a continuation of U.S. patent application Ser. No. 09/556,080 filed on Apr. 21, 2000 now U.S. Pat. No. 6,445,711. This application claims priority under 35 U.S.C. § 119(e) of the co-pending U.S. provisional application Ser. No. 60/130,886 filed on Apr. 23, 1999 and entitled "Network Bridging System And Method." The provisional application Ser. No. 60/130,886 filed on Apr. 23, 1999 and entitled "Network Bridging System And Method" is also hereby incorporated by reference.

FIELD OF THE INVENTION

The present invention relates to the field of sending control communications to devices within a network. More particularly, the present invention relates to the field of sending control communications to bridges within a network for effecting control and allocating resources along a communications route.

BACKGROUND OF THE INVENTION

The IEEE Std 1394-1995 standard, "1394 Standard For A High Performance Serial Bus," is an international standard for implementing an inexpensive high-speed serial bus architecture which supports both asynchronous and isochronous format data transfers. In addition, the IEEE Std 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE Std 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure.

Asynchronous transfers are traditional reliable data transfer operations which take place as soon as arbitration is won and transfer a maximum amount of data from a source to a destination. Asynchronous transfers are used for control purposes, including the setup of isochronous communications.

The IEEE Std 1394-1995 standard provides a high-speed serial bus for interconnecting digital devices thereby providing a universal I/O connection. The IEEE Std 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE Std 1394-1995 standard is very thin in size compared to other bulkier cables used to connect such devices in other connection schemes. Devices can be added and removed from an IEEE Std 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE Std 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE Std 1394-1995 cable. The physical layer 16 also provides arbitration to ensure that all devices coupled to the IEEE Std 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

IEC-61883 is a ratified international standard for the transport of audio/video command requests and responses. This standard uses the concept of plugs and plug control registers to manage and control the attributes of isochronous data flows. It should be noted that plugs do not physically exist on an audio/video device, but a plug is used to establish an analogy with existing audio/video devices where each flow of information is routed through a physical plug.

An isochronous data flow flows from one transmitting device to one or more receiving devices, by transmitting isochronous packets on an isochronous channel of the IEEE Std 1394-1995 serial bus. Each isochronous data flow is transmitted to an isochronous channel through one output plug on the transmitting device and is received from that isochronous channel through one input plug on the receiving device.

The transmission of an isochronous data flow through an output plug is controlled by an output plug control register (oPCR) and an output master plug register (oMPR) located on the transmitting device. The output master plug register controls all attributes that are common to all isochronous data flows transmitted by the corresponding transmitting device. The output plug control register controls all attributes of the corresponding isochronous data flow that are independent from attributes of other isochronous data flows transmitted by the transmitting device.

The reception of an isochronous data flow through an input plug is controlled by an input plug control register (iPCR) and an input master plug register (iMPR) located on the receiving device. The input master plug register controls all attributes that are common to all isochronous data flows received by the receiving device. The input plug control register controls all attributes of the corresponding isochronous data flow that are independent from attributes of other isochronous data flows received by the receiving device.

An isochronous data flow can be controlled by any device connected to the IEEE Std 1394-1995 bus by modifying the corresponding plug control registers. Plug control registers can be modified through asynchronous transactions on the IEEE Std 1394-1995 bus or by internal modifications if the plug control registers are located on the controlling device.

To transport isochronous data between two audio/video devices on the IEEE Std 1394-1995 bus, it is necessary for an application to connect an output plug on the transmitting device to an input plug on the receiving device using an isochronous channel. The relationship between one input plug, one output plug and one isochronous channel is called a point-to-point connection. A point-to-point connection can only be broken by the application or initiating device that established it. An application can also just start the transmission or reception of an isochronous data flow on its own device by connecting one of its output or input plugs respectively to an isochronous channel. The relationship between one output plug and one isochronous channel is called a broadcast-out connection. The relationship between one input plug and one isochronous channel is called a broadcast-in connection. Broadcast-out and broadcast-in connections are collectively called broadcast connections. A broadcast connection can be established only by the device on which the plug is located, but it can be broken by any device.

The IEEE working group, "p 1394.1 Draft standard for High Performance Serial Bus Bridges", is a working group draft related to the IEEE Std 1394-1995 standard for implementing bus bridges between multiple IEEE Std 1394-1995 buses. Bridges within a net of multiple buses of devices forward request and response subactions from one bus to another, allowing transaction requester and responder components to be located on different buses.

An exemplary IEEE Std 1394-1995 network of three buses of devices is illustrated in FIG. 2. The first bus includes the devices a1, a2, and a3 coupled together by IEEE Std 1394-1995 cables. Specifically, the device a1 is coupled to the device a2 by the IEEE Std 1394-1995 cable 40. The device a2 is coupled to the device a3 by the IEEE Std 1394-1995 cable 42. The device a3 is then coupled to a first portal 22 of the bridge 20.

The bridge 20 couples the first bus to a second bus which includes the devices b1, b2 and b3. A second portal 24 of the bridge 20 is coupled to the device b1 by the IEEE Std 1394-1995 cable 46. The device b1 is coupled to the device b2 by the IEEE Std 1394-1995 cable 48. The device b1 is coupled to the device b2 by the IEEE Std 1394-1995 cable 48. The device b2 is coupled to the device b3 by the IEEE Std 1394-1995 cable 50. The device b3 is coupled to a first portal 32 of the bridge 30. The bridge 30 couples the second bus to a third bus which includes the devices c1 and c2. A second portal 34 of the bridge 30 is coupled to the device c1 by the IEEE Std 1394-1995 cable 54. The device c1 is coupled to the device c2 by the IEEE Std 1394-1995 cable 56.

The bridges 20 and 30 allow devices on the different buses to communicate with each other using both asynchronous and isochronous communications. For example, if the device a1 sends a communication to the device b3, the communication is passed along the first bus until it reaches the portal 22 of the bridge 20. The bridge 20 then recognizes that the communication is addressed to the device b3 and forwards the communication from the portal 22 to the portal 24. The communication is then passed along the second bus until it arrives at the device b3.

The components within a bridge device are illustrated in FIG. 3. The bridge device 60 includes asynchronous request and response queues and isochronous data and isochronous queues for each portal. The bridge 60 also includes a microprocessor device 70. The queues within the bridge 60 hold packets received on one bus but not yet transmitted to the adjacent bus. The asynchronous request queue 62 holds request and asynchronous-stream packets. The asynchronous response queue 64 holds response packets.

Isochronous packets received in cycle (n) are forwarded to the adjacent bus in cycle (n+K), where k is an implementation-dependent constant, using the isochronous data queue 66 and the isochronous clock queue 68. The isochronous data queue 66 holds isochronous packets which are selectively forwarded based on their channel number. The isochronous clock queue 68 holds the clock synchronization reference information which is forwarded from the primary bus outward and used to calibrate the clock on each bus. The request response, isochronous data and isochronous clock queues may be implemented as separate physical queues, or independently managed portions of a larger shared memory.

The bridge 60 also includes routing tables to determine which packets are forwarded to an adjacent bus. For asynchronous routing, the bridge 60 includes a bit-mapped table which specifies which packets are forwarded to the adjacent bus. For isochronous routing, the bridge 60 includes a table which specifies properties of an isochronous channel including whether the isochronous channel is forwarded to the adjacent bus, the channel number to be used on the adjacent bus and the speed to be used on the adjacent bus.

The bridge 60 also includes message mailbox locations to access low-bandwidth facilities including initialization and isochronous management. The initialization protocols are responsible for each buses' assigned net-unique bus ID address and bridge routing which utilizes routing tables set to enable asynchronous subaction routing. The messages within the message mailbox are used to manage isochronous resource allocations.

Within the bridge 60, directed-asynchronous routing decisions are made using the destination ID addresses of packets being passed through the bridge 60. Accepted packets are directly routed to the opposing part of the bridge 60. This destination routing is based on a bus ID routing table. In the most general case, one or more routing bits can be independently specified for each of the 1024 possible bus numbers.

An isochronous connection between a talker device and listener device is incrementally formed in the talker-to-listener direction. The portal of the bridge coupled to the talker device, on the routing path, is first directed to establish the appropriate talker bus connections by an initiation message sent from a controlling device to this portal. This portal then acquires the necessary isochronous resources on the talker device's local bus, sends a query transaction to discover next-path identifiers and sends confirmation to the controlling device which includes the next-path identifiers.

The controlling device then sends an initiation message to each bridge within the route between the talker device and the listener device, in turn. Each bridge along the route upon receiving the initiation message from the controlling device then acquires the necessary isochronous resources on the corresponding bus in the route, sends a query transaction to discover next-path identifiers and sends a confirmation to the controlling device which includes the next-path identifiers. This continues until all bridges in the route between the talker device and the listener device have acquired the necessary isochronous resources on each of the buses within the route.

In the manner described above, the isochronous connection between a talker device and a listener device is established by a controlling device. To establish this isochronous connection and have the necessary resources allocated, the controlling device communicates with each bridge within the route between the talker device and the listener device. This consumes significant resources of both the controlling device and each bridge and bus within the route between the talker device and the listener device.

SUMMARY OF THE INVENTION

An asynchronous control mechanism packet is used to send control messages and information to one or more bridge devices within a network of buses of devices. The asynchronous control mechanism packet is addressed to a device on one of the buses and is intercepted by one of the appropriate bridge devices along the path to the destination device. The asynchronous control mechanism packet is targeted at a particular bridge device or used to send control messages and information to bridge devices along a particular communications route between two devices. The asynchronous control mechanism packet includes a designation specifying that it is an asynchronous control mechanism packet and should be treated accordingly, and an indication of whether the packet should be processed by the first of the last portal between the source and destination buses.

This designation is recognized by the appropriate bridge devices. Preferably, this designation is included within the extended transaction code field of the packet. In an alternate embodiment, the designation is included within a transaction code field of the packet. In a further alternate embodiment, the designation is included within an address offset value within the packet. Instructional information within the asynchronous control mechanism packet specifies to intercepting bridge devices the type of transaction and control tasks to be performed by the bridge device when the asynchronous control mechanism packet is received.

In one aspect of the present invention, an asynchronous control mechanism packet includes an address value corresponding to a target device on a target bus, a designation and instructional information, wherein the designation within the asynchronous control mechanism packet causes a bridge device coupled to the target device and the target bus to intercept the packet and utilize the instructional information to perform one or more control tasks specified by the designation and the instructional information. The designation is preferably included within an extended transaction code field within the asynchronous control mechanism packet. Alternatively, the designation is included within a transaction code field within the asynchronous control mechanism packet. In a further alternative embodiment, designation is included within an address offset value within the asynchronous control mechanism packet. The instructional information specifies a type of transaction and the control tasks to be performed. The asynchronous control mechanism packet is not forwarded to the target device. The designation and instructional information instruct the bridge device to establish an isochronous connection between a talker device and a listener device. Each bridge device within a route between the talker device and the listener device intercept the asynchronous control mechanism packet and allocate resources necessary to establish the isochronous connection between the talker device and the listener device. The talker device and the listener device are preferably coupled within a network of buses that substantially complies with a version of an IEEE Std 1394 standard.

In another aspect of the present invention, a method of effecting control of a bridge device coupled to a target device on a target bus includes the steps of sending an asynchronous control mechanism packet directed to the target device which includes an address value corresponding to the target device, a designation and instructional information, receiving the asynchronous control mechanism packet at the bridge device and utilizing the instructional information to perform one or more control tasks specified by the designation and the instructional information. The asynchronous control mechanism packet is not forwarded to the target device. The designation is preferably included within an extended transaction code field within the asynchronous control mechanism packet. Alternatively, the designation is included within a transaction code field within the asynchronous control mechanism packet. In a further alternative embodiment, the designation is included within an address offset value within the asynchronous control mechanism packet. In one application, the step of utilizing establishes an isochronous connection between a talker device and a listener device. The steps of sending, receiving and utilizing are performed by each bridge device within a route between the talker device and the listener device and further wherein each of the bridge devices within the route allocate resources necessary to establish the isochronous connection between the talker device and the listener device. The talker device and the listener device are preferably coupled within a network of buses that substantially complies with a version of an IEEE Std 1394 standard.

In yet another aspect of the present invention, a method of establishing an isochronous connection between a talker device and a listener device within a network of buses. The bridge devices are coupled between buses within the network of buses. The method includes the steps of sending an asynchronous control mechanism packet from an initiating device directed to a selected one of the talker device and the listener devices. The asynchronous control mechanism packet includes an address value corresponding to the selected one of the talker devices and the listener devices and a designation specifying that the packet is an asynchronous control mechanism packet, and then receiving the asynchronous control mechanism packet at a current bridge device within the route between the talker device and the listener device. At that bridge allocating resources necessary to establish the isochronous connection between the talker device and the listener device. Determining if the current bridge device is a final bridge device within the route, passing the asynchronous control mechanism packet on to a next bridge device and repeating the steps of receiving the asynchronous control mechanism packet, allocating resources and determining if the current bridge device is a final bridge device within the route. If it is determined that the current bridge device is not the final bridge device within the route, and sending a control message to the initiating device if it is determined that the current bridge device is the final bridge device within the route. None of the asynchronous control mechanism packets are forwarded to the selected one of the talker device and the listener device. The designation is preferably included within an extended transaction code field within the asynchronous control mechanism packet. Alternatively, the designation is included within a transaction code field within the asynchronous control mechanism packet. In a further alternative embodiment, the designation is included within an address offset value within the asynchronous control mechanism packet. The network of buses preferably substantially complies with a version of an IEEE Std 1394 standard.

In still yet another aspect of the present invention, a bridge device configured for coupling between two or more buses of devices includes a first portal interface configured for coupling to and communicating with a first bus of devices, a second portal interface configured for coupling to and communicating with a second bus of devices and a detecting and control circuit coupled to the first portal interface and the second portal interface for detecting when the first portal interface and the second portal interface receive an asynchronous control mechanism packet directed to a target device, wherein the asynchronous control mechanism packet includes an address value corresponding to the target device, a designation and instructional information and further wherein the detecting and control circuit performs one or more control tasks specified by the designation and the instructional information. The designation is preferably included within an extended transaction code field within the asynchronous control mechanism packet. Alternatively, the designation is included within a transaction code field within the asynchronous control mechanism packet. In a further alternative embodiment, the designation is included within an address offset value within the asynchronous control mechanism packet. The one or more control tasks performed by the detecting and control circuit establish an isochronous connection between a talker device and a listener device. The bridge device and the two or more buses preferably substantially comply with a version of an IEEE Std 1394 standard.

In yet another aspect of the present invention, a network of devices coupled together by two or more buses, wherein bridge devices within the network couple different buses of devices to each other, each of the bridge devices include a first portal interface configured for coupling to and communicating with a first bus of devices, a second portal interface configured for coupling to and communicating with a second bus of devices and a detecting and control circuit coupled to the first portal interface and the second portal interface for detecting when the first portal interface and the second portal interface receive an asynchronous control mechanism packet directed to a target device, wherein the asynchronous control mechanism packet includes an address value corresponding to the target device, a designation and instructional information and further wherein the detecting and control circuit performs one or more control tasks specified by the designation and the instructional information. The designation is preferably included within an extended transaction code field within the asynchronous control mechanism packet. Alternatively, the designation is included within a transaction code field within the asynchronous control mechanism packet. In a further alternative embodiment, the designation is included within an address offset value within the asynchronous control mechanism packet. The one or more control tasks performed by the detecting and control circuit establish an isochronous connection between a talker device and a listener device. The network of devices preferably substantially complies with a version of an IEEE Std 1394 standard.

DETAILED DESCRIPTION OF THE PREFERRED EMBODIMENT

The present invention provides an alternative to the above-discussed method for establishing an isochronous connection between a talker device and a listener device. A new transaction type is herein defined for effective control of bridge devices along an isochronous communications route between a talker device and a listener device. Preferably, the new transaction type is included within an asynchronous command packet which is addressed to a node on a remote bus. The packet is then routed along the bus towards the addressed node. When the packet is received by a bridge within the routing path, the bridge intercepts and processes the packet. This processing includes allocating the necessary resources for the isochronous connection. If appropriate, the bridge then forwards the packet on towards the addressed node along the routing path. In this manner, this asynchronous control mechanism packet is sent from bridge to bridge along the routing path between the talker device and the listener device to establish an isochronous connection and allocate the necessary isochronous resources along the routing path. The asynchronous control mechanism packet of the present invention can also be targeted towards a particular bridge device, by addressing it to a specific device and causing it to be intercepted by the bridge device controlling communications on the destination bus.

The asynchronous control mechanism packet of the present invention allows an initiating or controlling device to send a single communication to the addressed node which will cause the bridge devices within the routing path to process the packet and establish the isochronous connection. The controlling device does not need to send separate communications to each bridge within the routing path and establish the route for the isochronous communication. The controlling device can send the asynchronous control mechanism packet without knowing the appropriate route or which bridge devices are included within that route. By sending an asynchronous packet, the controlling device takes advantage of the asynchronous routing tables already established by the bridges within the network. Accordingly, the resources of the controlling device are conserved and are not required to actively participate in the establishment of the isochronous connection at each bridge device within the routing path.

Preferably, the asynchronous control mechanism packet of the present invention is used to establish and teardown an isochronous connection between a talker device and a listener device, as described herein. However, it should be apparent to those skilled in the art that the asynchronous control mechanism packet of the present invention can also be used for other functions, including other bridge control functions.

Figure 1:
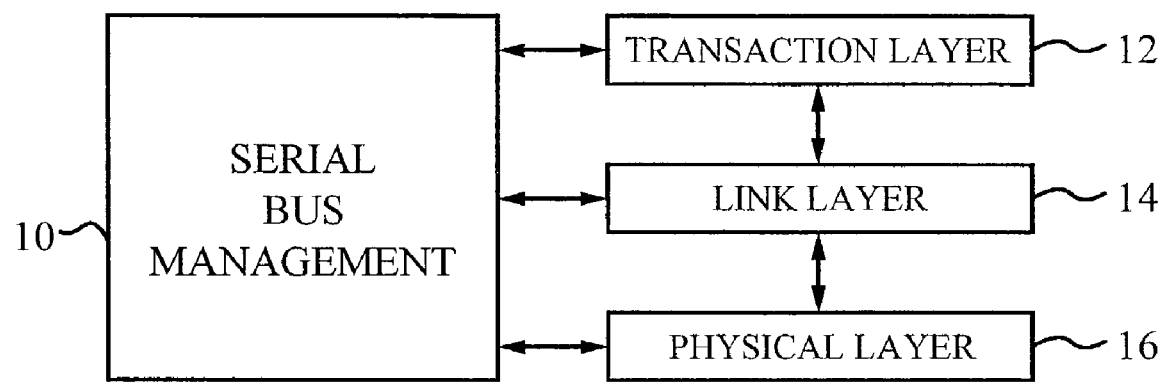
FIG. 1 illustrates a protocol defined by the IEEE Std 1394 standard.
Figure 2:
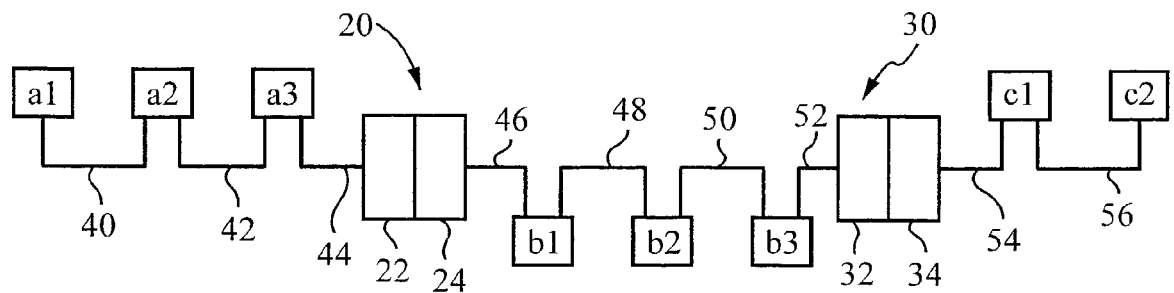
FIG. 2 illustrates an exemplary network of three buses of devices.
Figure 3:
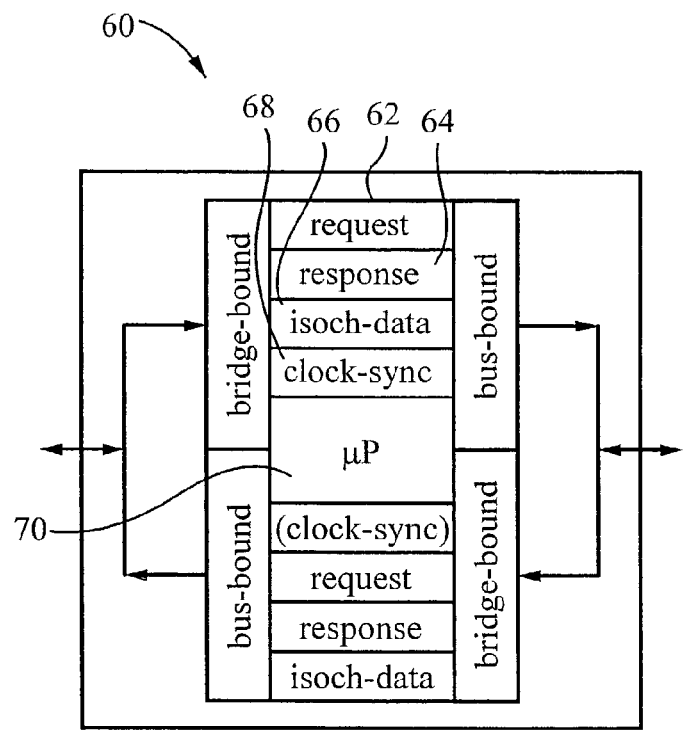
FIG. 3 illustrates components within a bridge device.

A bridge device according to the present invention preferably includes the components as illustrated in FIG. 3 and discussed above and also has the ability to detect an asynchronous control mechanism packet of the present invention. Accordingly, when the bridge device of the present invention receives an asynchronous control mechanism packet, it will treat it appropriately, including implementing any controls and performing any necessary tasks specified in the asynchronous control mechanism packet.

Figure 4:
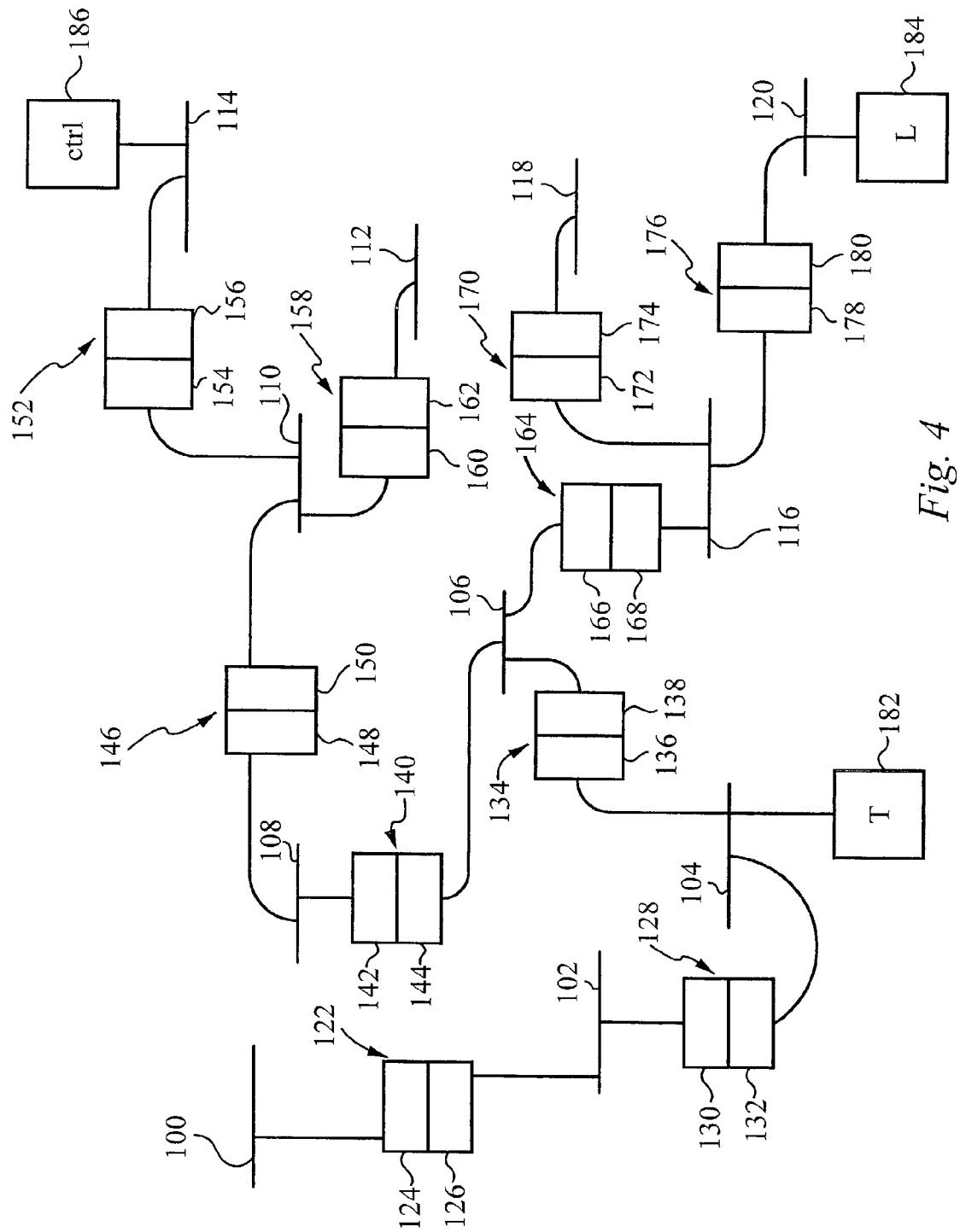
FIG. 4 illustrates an exemplary network of IEEE Std 1394-1995 buses and bridge devices.

An exemplary network of IEEE Std 1394-1995 buses and bridge devices is illustrated in FIG. 4. Within FIG. 4, the horizontal lines 100, 102, 104, 106, 108, 110, 112, 114, 116, 118 and 120 are used to designate buses of one or more devices. Within the exemplary network of FIG. 4, the IEEE Std 1394-1995 bus 100 is coupled to a first portal 124 of a bridge device 122. A second portal 126 of the bridge device 122 is coupled to the IEEE Std 1394-1995 bus 102. The bus 102 is coupled to a first portal 130 of a bridge device 128. A second portal 132 of the bridge device 128 is coupled to the IEEE Std 1394-1995 bus 104. A talker device 182 is coupled as a device within the bus 104.

The bus 104 is coupled to a first portal 136 of a bridge device 134. A second portal 138 of the bridge device 134 is coupled to the IEEE Std 1394-1995 bus 106. The bus 106 is coupled to a first portal 144 of a bridge device 140 and a first portal 166 of a bridge device 164. A second portal 142 of the bridge device 140 is coupled to the IEEE Std 1394-1995 bus 108. The bus 108 is also coupled to a first portal 148 of a bridge device 146. The second portal 150 of the bridge device 146 is coupled to the IEEE Std 1394-1995 bus 110. The bus 110 is coupled to a first portal 154 of a bridge device 152 and a first portal 160 of a bridge device 158. A second portal 162 of the bridge device 158 is coupled to the IEEE Std 1394-1995 bus 112. A second portal 156 of the bridge device 152 is coupled to the IEEE Std 1394-1995 bus 114. A controlling device 186 is coupled as a device within the bus 114.

A second portal 168 of the bridge device 164 is coupled to the IEEE Std 1394-1995 bus 116. The bus 116 is coupled to a first portal 172 of a bridge device 170 and a first portal 178 of a bridge device 176. A second portal 174 of the bridge device 170 is coupled to the IEEE Std 1394-1995 bus 118. A second portal 180 of a bridge device 176 is coupled to the IEEE Std 1394-1995 bus 120. A listener device 184 is coupled as a device within the bus 120.

The asynchronous control mechanism packet of the present invention is preferably an asynchronous block write packet. Alternatively, the asynchronous control mechanism packet of the present invention can be included within any appropriate packet type including read, write and lock.

Figure 5:
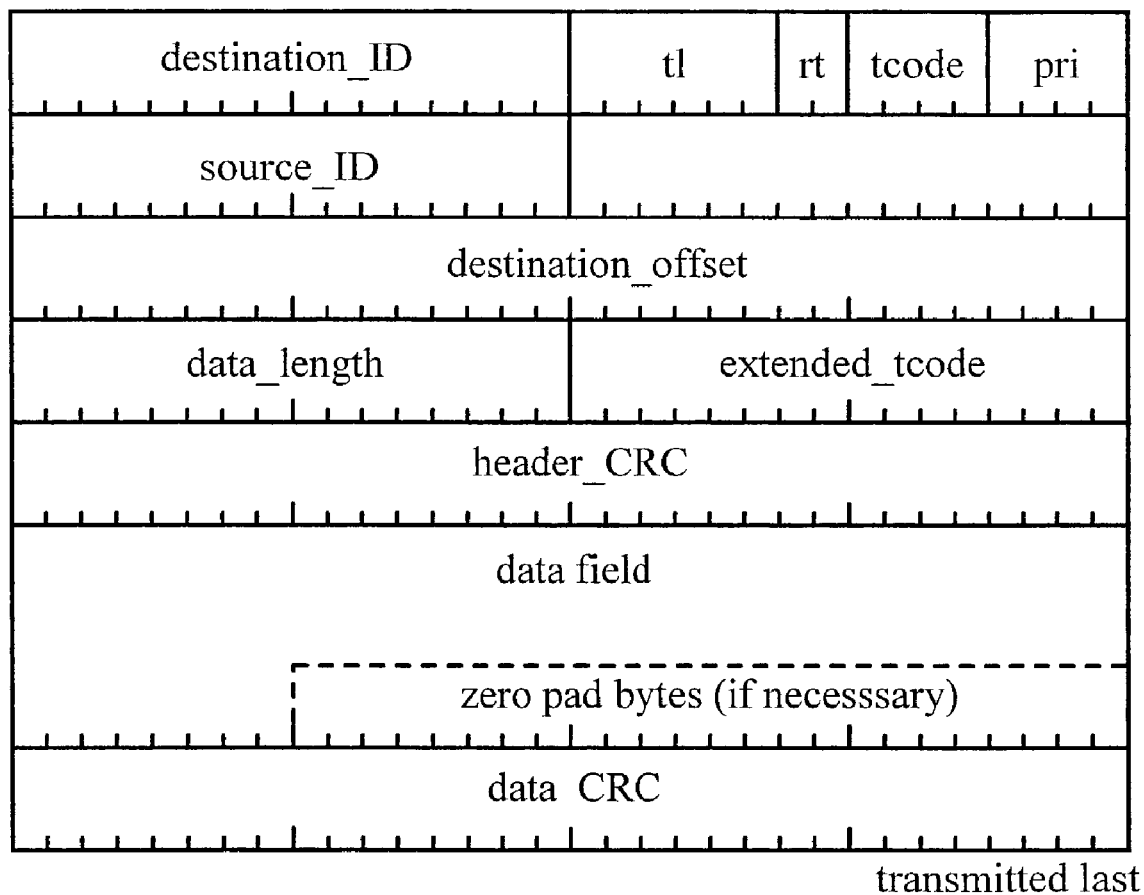
FIG. 5 illustrates a format of a block write packet according to the IEEE Std 1394-1995 standard.

A format of a block write packet according to the IEEE Std 1394-1995 is illustrated in FIG. 5. The asynchronous block write packet includes a header and a data payload. The header includes the fields destination_ID, tl, rt, tcode, pri, source_ID, destination_offset, data_length, extended_tcode and header_crc. The destination_ID field is a sixteen bit field which specifies the node ID of the receiving node to which the packet is addressed. The transaction label field tl is a six bit field that specifies a unique tag for each outstanding transaction from a node. The retry code field rt is a two bit field which specifies whether the packet is a retry attempt and the retry protocol to be followed by the destination node. The transaction code field tcode is a four bit field that specifies the packet format and the type of transaction that is to be performed. For a write request for data block operation the transaction code field value is 0001. Within the possible values for the transaction code field, there are currently five values that are reserved.

The priority field pri is a four bit field that is used by the back plane. The source-ID field is a sixteen bit field that specifies the node ID of the transmitting node of the packet. The destination offset field is a forty-eight bit field that specifies the forty-eight bits of the destination node address of request packet. The data length field is a sixteen bit field that specifies the length of the data field of data block payload packets. The extended transaction code field extended_tcode is a sixteen bit field that conventionally is only meaningful if the transaction code field indicates a lock request or lock response packet. The header_CRC field is a thirty-two bit field that is used to perform a cyclical redundancy check (CRC) on the data within the header.

The data portion of the packet includes a data block payload field and a data_crc field. The data_crc field is a thirty-two bit field that is used to perform a cyclical redundancy check (CRC) on the data within the data portion of the packet.

In one embodiment of the present invention, a new transaction code value within the transaction code field is utilized to specify that a packet is an asynchronous control mechanism packet according to the present invention. The new transaction code value is any one of the currently available transaction code reserved values. In this embodiment, when the transaction code field tcode within a packet includes this value, a bridge device receiving this packet will know that this packet is an asynchronous control mechanism packet and should be treated accordingly.

In the preferred embodiment of the present invention, an extended transaction code value within the extended transaction code field extended_tcode and an existing transaction code, such as the transaction code for the asynchronous block write packet, are used to specify that the packet is an asynchronous control mechanism packet according to the present invention. The extended transaction code field is currently only used with lock transactions. Accordingly, the extended transaction code field is currently unused for block read and write transactions. Even when used with lock transactions, only a few bits of the extended transaction code field are used. The extended transaction code field is not available in quadlet read or write transactions. Accordingly, in this embodiment only block transactions are used for an asynchronous control mechanism packet. The new extended transaction code value is preferably any one of the currently available extended transaction code reserved values. In this embodiment, when the extended transaction code field extended_tcode includes this value, a bridge device receiving this packet will know that this packet is an asynchronous control mechanism packet and should be treated accordingly.

In an alternate embodiment, an address offset value an otherwise unused address space of a node is utilized with existing transaction codes to specify an asynchronous control mechanism packet according to the present invention. In this embodiment, the asynchronous control mechanism packet will include an existing transaction code field value but will include an address offset value in private address space that will signal to a bridge device receiving the packet that the packet is an asynchronous control mechanism packet and should be handled accordingly.

When a bridge device receives a packet that it determines is an asynchronous control mechanism packet according to the present invention, it processes the packet according to the data included within the packet. If the packet instructs the bridge to establish an isochronous connection; the bridge acquires the necessary bus resources for the appropriate buses and then determines, based on the address of the packet, if the packet should be forwarded to another bridge device. If the packet should be forwarded to another bridge device, the bridge device then puts the packet on the appropriate bus based on the destination address within the packet and the routing tables. If the bridge device is the final bridge within the routing path, the bridge device does not forward the packet, but sends a status packet to the controlling device informing the controlling device that the isochronous connection has been established.

Figure 6:
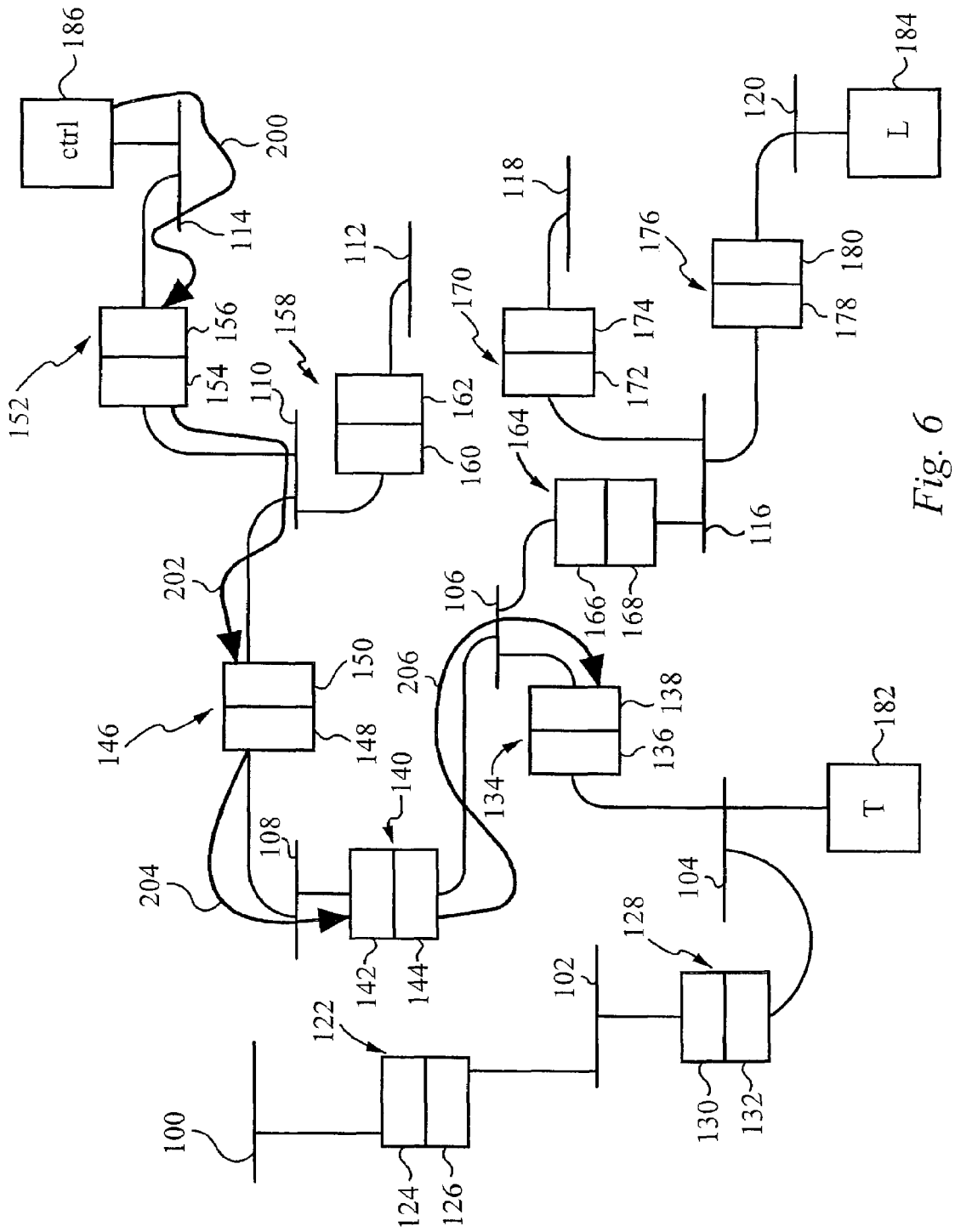
FIG. 6 illustrates an exemplary operation of a network of devices utilizing the asynchronous control mechanism packet of the present invention.
Figure 7:
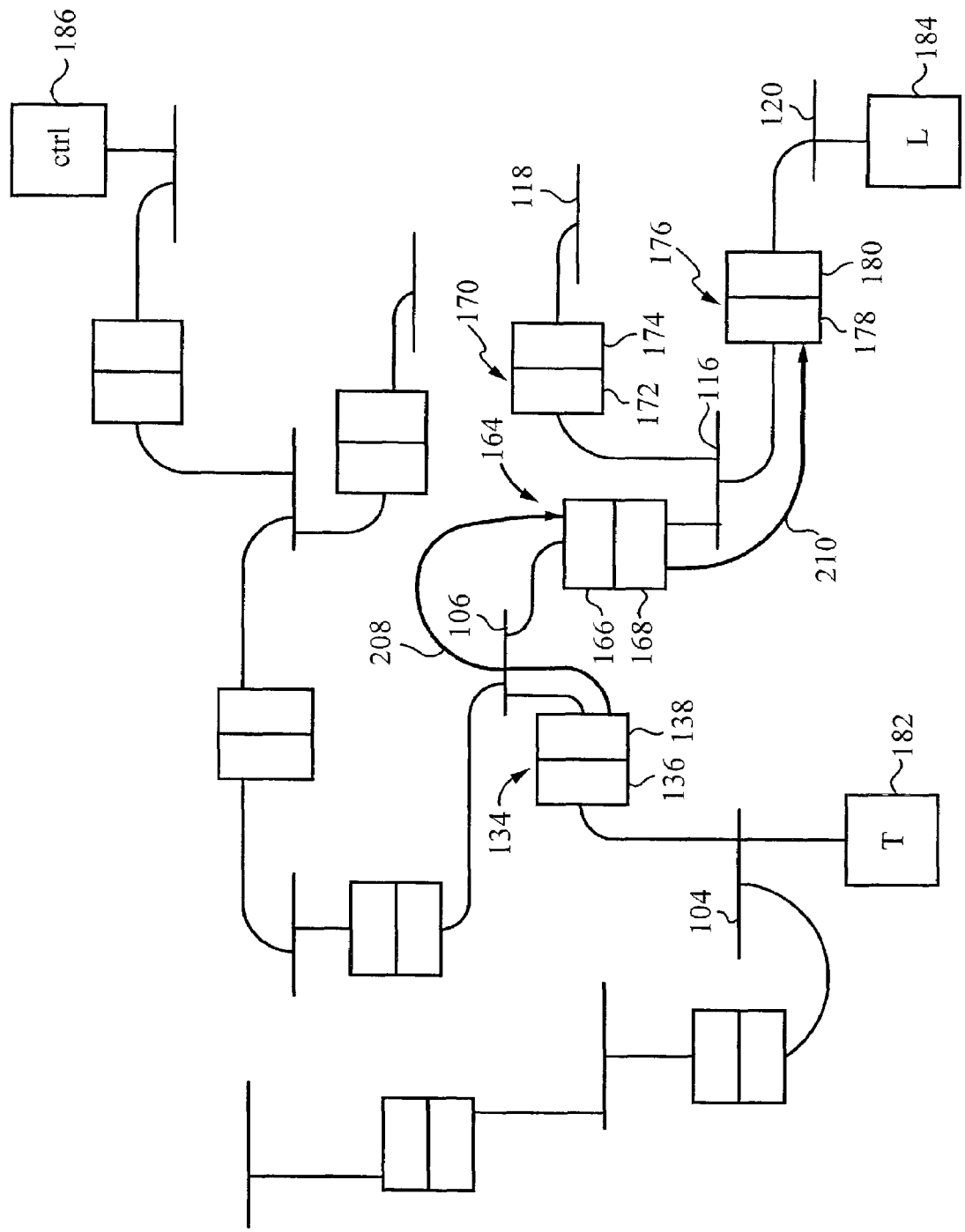
FIG. 7 illustrates an exemplary operation of a network of devices utilizing the asynchronous control mechanism packet of the present invention.

An example of the operation of a network of devices utilizing the asynchronous control mechanism packet of the present invention is illustrated in FIGS. 6 and 7. In this example, the path of an asynchronous control mechanism packet initiated by the controlling device 186 is illustrated by the bold lines 200, 204 and 206 in FIG. 6 and the bold lines 208 and 210 in FIG. 7. The example illustrated in FIGS. 6 and 7 utilizes the asynchronous control mechanism packet of the present invention sent from the controlling device 186 to establish an isochronous connection between the talker device 182 and the listener device 184.

The controller device 186 initiates the asynchronous control mechanism packet to establish the isochronous connection between the talker device 182 and the listener device 184. The packet from the controller device 186 is addressed to the talker device 182 and includes a designation and instructional information specifying to the bridge devices that this is an asynchronous control mechanism packet and should be treated accordingly. As discussed above, preferably this designation is an extended transaction code value.

When the packet is transmitted from the controller device 186, the packet is put on the bus 114 and accepted by the first portal 156 of the bridge device 152. The bridge device 152 then determines that this packet is an asynchronous control mechanism packet, but that the bridge 152 is not in the asynchronous route between the talker device 182 and the listener device 184. Accordingly, the bridge 152 forwards the packet to the portal 154 which puts the packet on the bus 110. The packet is then accepted by the portal 150 of the bridge device 146. The bridge device 146 then determines that this packet is an asynchronous control mechanism packet, but that the bridge device 146 is not in the asynchronous route between the talker device 182 and the listener device 184. Accordingly, the bridge 146 forwards the packet to the portal 148 which puts the packet on the bus 108.

The packet is then accepted by the portal 142 of the bridge device 140. The bridge device 140 then determines that this packet is an asynchronous control mechanism packet but that the bridge 140 is not in the asynchronous route between the talker device 182 and the listener device 184. Accordingly, the bridge 140 forwards the packet to the portal 144 which puts the packet on the bus 106.

The packet is then accepted by the portal 138 of the bridge device 134. The bridge device 134 then determines that this packet is an asynchronous control mechanism packet and that the bridge device 134 is in the asynchronous route between the talker device 182 and the listener device 184. Accordingly, the bridge device 134 then reserves the appropriate isochronous resources on the buses 104 and 106. The bridge device 134 then puts an in-stream version of the asynchronous control mechanism packet on the bus 106 directed to the listener device 184.

This in-stream version of the packet is then routed to the portal 166 of the bridge device 164, as illustrated in FIG. 7. The bridge device 164 then determines that this is an asynchronous control mechanism packet in route to the listener device 184. Accordingly, the bridge device 164 determines that it is in the route from the talker device 182 to the listener device 184 and then reserves the appropriate resources on the bus 116 and sets up the data stream through the bridge device 164. The bridge device 164 then forwards the packet through the portal 168 onto the bus 116 directed to the listener device 184.

The packet is then routed to the portal 178 of the bridge device 176. The bridge device 176 then determines that this is an asynchronous control mechanism packet in route to the listener device 184. Accordingly, the bridge device 176 determines that it is in the route from the talker device 182 to the listener device 184 and then reserves the appropriate resources on the bus 120 and sets up the data stream through the bridge device 176. Because this bridge device 176 is the final bridge device before the listener device 184, the bridge device 176 does not forward the asynchronous control mechanism packet any further. Instead, the bridge device 176 sends a status packet to the controlling device 186 informing the controlling device 186 that the isochronous connection between the talker device 182 and the listener device 184 has been established. Accordingly, the asynchronous control mechanism packet is preferably never forwarded to the listener device 184 to which it was addressed.

The example illustrated in FIGS. 6 and 7 is initiated by the controlling device 186 and establishes the isochronous connection from the bridge device 134 closest to the talker device 182 to the bridge device 176 closest to the listener device 184 and every other bridge device within the route between the talker device 182 and the listener device 184. It should be apparent that the isochronous connection can also be established in the other direction from the bridge device 176 closest to the listener device 184 to the bridge device 134 closest to the talker device 134.

The asynchronous control mechanism packet of the present invention is used to send control messages and information to one or more bridge devices within a network of buses of devices. The asynchronous control mechanism packet is addressed to a device on one of the buses and is intercepted by one or more appropriate bridge devices along the path to the destination device. The asynchronous control mechanism packet can be targeted at a particular bridge device or can be used to send control information to bridge devices along a particular communications route between two devices, as described above. The asynchronous control mechanism packet includes a designation which specifies that it is an asynchronous control mechanism packet and should be treated accordingly. Preferably, this designation is included within the extended transaction code field of the packet. In an alternate embodiment, the designation is included within a transaction code field of the packet. In a further alternative embodiment, the designation is included within an address offset value within the asynchronous control mechanism packet. Instructional information within the asynchronous control mechanism packet specifies to intercepting bridge devices the type of transaction and control tasks to be performed, such as allocating appropriate isochronous resources and forwarding the asynchronous control mechanism packet. The asynchronous control mechanism packet of the present invention allows an initiating device to send a single control packet which effects control over one or more appropriate bridge devices, which are either targeted or within a specified communications route.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of preferred embodiments of the invention. Specifically, it will be apparent to those skilled in the art that while the preferred embodiment of the present invention is used with an IEEE Std 1394-1995 serial bus structure, the present invention could also be implemented on any other appropriate digital interfaces or bus structures, including other or later versions of the IEEE Std 1394 serial bus.

We claim:

1. A method of effecting control of a bridge device coupled to a target device on a target bus comprising the steps of:
   a. sending an asynchronous control mechanism packet directed to the target device which includes an address value corresponding to the target device, a designation and instructional information;
   b. receiving the asynchronous control mechanism packet at the bridge device; and
   c. utilizing the instructional information to perform one or more control tasks specified by the designation and the instructional information.

2. The method as claimed in claim 1 wherein the asynchronous control mechanism packet is not forwarded to the target device.

3. The method as claimed in claim 1 wherein the designation is included within an extended transaction code field within the asynchronous control mechanism packet.

4. The method as claimed in claim 1 wherein the designation is included within a transaction code field within the asynchronous control mechanism packet.

5. The method as claimed in claim 1 wherein the designation is included within an address offset value within the asynchronous control mechanism packet.

6. The method as claimed in claim 1 wherein the step of utilizing establishes an isochronous connection between a talker device and a listener device.

7. The method as claimed in claim 6 wherein the steps of sending, receiving and utilizing are performed by each bridge device within a route between the talker device and the listener device and further wherein each of the bridge devices within the route allocate resources necessary to establish the isochronous connection between the talker device and the listener device.

8. The method as claimed in claim 7 wherein the talker device and the listener device are coupled within a network of buses that substantially complies with a version of an IEEE Std 1394 standard.

9. A bridge device configured for coupling between two or more buses of devices comprising:
   a. a first portal interface configured for coupling to and communicating with a first bus of devices;
   b. a second portal interface configured for coupling to and communicating with a second bus of devices; and
   c. a detecting and control circuit coupled to the first portal interface and the second portal interface for detecting when the first portal interface and the second portal interface receive an asynchronous control mechanism packet directed to a target device, wherein the asynchronous control mechanism packet includes an address value corresponding to the target device, a designation and instructional information and further wherein the detecting and control circuit performs one or more control tasks specified by the designation and the instructional information.

10. The bridge device as claimed in claim 9 wherein the designation is included within an extended transaction code field within the asynchronous control mechanism packet.

11. The bridge device as claimed in claim 9 wherein the designation is included within a transaction code field within the asynchronous control mechanism packet.

12. The bridge device as claimed in claim 9 wherein the designation is included within an address offset value within the asynchronous control mechanism packet.

13. The bridge device as claimed in claim 9 wherein the one or more control tasks performed by the detecting and control circuit establish an isochronous connection between a talker device and a listener device.

14. The bridge device as claimed in claim 9 wherein the bridge device and the two or more buses substantially comply with a version of an IEEE Std 1394 standard.

15. A network of devices coupled together by two or more buses, wherein bridge devices within the network couple different buses of devices to each other, each of the bridge devices comprising:
   a. a first portal interface configured for coupling to and communicating with a first bus of devices;
   b. a second portal interface configured for coupling to and communicating with a second bus of devices; and
   c. a detecting and control circuit coupled to the first portal interface and the second portal interface for detecting when the first portal interface and the second portal interface receive an asynchronous control mechanism packet directed to a target device, wherein the asynchronous control mechanism packet includes an address value corresponding to the target device, a designation and instructional information and further wherein the detecting and control circuit performs one or more control tasks specified by the designation and the instructional information.

16. The network of devices as claimed in claim 15 wherein the designation is included within an extended transaction code field within the asynchronous control mechanism packet.

17. The network of devices as claimed in claim 15 wherein the designation is included within a transaction code field within the asynchronous control mechanism packet.

18. The network of devices as claimed in claim 15 wherein the designation is included within an address offset value within the asynchronous control mechanism packet.

19. The network of devices as claimed in claim 15 wherein the one or more control tasks performed by the detecting and control circuit establish an isochronous connection between a talker device and a listener device.

20. The network of devices as claimed in claim 15 wherein the network of devices substantially complies with a version of an IEEE Std 1394 standard.

* * * * *